United States Patent
Jeffrey (10) Patent No.: US 12,474,750 B2
(45) Date of Patent: Nov. 18, 2025

(54) INTERLEAVED CRYOGENIC COOLING SYSTEM FOR QUANTUM COMPUTING APPLICATIONS

(71) Applicant: Google LLC, Mountain View, CA (US)

(72) Inventor: Evan Robert Jeffrey, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 1254 days.

(21) Appl. No.: 17/230,085

(22) Filed: Apr. 14, 2021

(65) Prior Publication Data

US 2021/0326739 A1  Oct. 21, 2021

Related U.S. Application Data

(60) Provisional application No. 63/010,339, filed on Apr. 15, 2020.

(51) Int. Cl.

| G06F 1/20 | (2006.01) |
|---|---|
| H03K 19/195 | (2006.01) |
| H05K 7/20 | (2006.01) |
| F25B 9/10 | (2006.01) |
| F25B 9/12 | (2006.01) |

(52) U.S. Cl.
CPC ............. *G06F 1/20* (2013.01); *H03K 19/195* (2013.01); *H05K 7/20372* (2013.01); *F25B 9/10* (2013.01); *F25B 9/12* (2013.01)

(58) Field of Classification Search
CPC ................. G06F 1/20; H03K 19/195
See application file for complete search history.

(56) References Cited

U.S. PATENT DOCUMENTS

| 2011/0025145 A1* | 2/2011 | Auernhammer | H02K 1/20 310/58 |
|---|---|---|---|
| 2012/0189887 A1* | 7/2012 | Hohenthanner | H01M 10/486 429/247 |
| 2013/0186109 A1* | 7/2013 | Atrey | F28F 3/08 29/890.035 |
| 2013/0231249 A1 | 9/2013 | Black et al. | |
| 2014/0260336 A1* | 9/2014 | Bonnay | G05D 23/1951 62/6 |

(Continued)

OTHER PUBLICATIONS

International Preliminary Report on Patentability for Application No. PCT/US2021/027191, mailed Oct. 27, 2022, 11 pages.

(Continued)

*Primary Examiner* — Paul A Wartalowicz
(74) *Attorney, Agent, or Firm* — DORITY & MANNING P.A.

(57) ABSTRACT

A cryogenic cooling system for use in quantum computing applications can include a plurality of cryogenic cooling stages. Each of the plurality of cryogenic cooling stages can include a plurality of interleaved cooling units. The plurality of interleaved cooling units can include a first cooling unit and a second cooling unit. Each of the plurality of interleaved cooling units can have an associated operating temperature range. One or more signal lines that couple one or more classical processors to one or more quantum systems can pass through each of the plurality of interleaved cooling units for each of the plurality of cryogenic cooling stages.

20 Claims, 7 Drawing Sheets

(56) References Cited

U.S. PATENT DOCUMENTS

| | | | |
|---|---|---|---|
| 2017/0227267 A1 | 8/2017 | Uchaykin | |
| 2018/0112928 A1* | 4/2018 | Dorr | F28F 21/02 |
| 2019/0292906 A1* | 9/2019 | Stark | G01H 9/004 |
| 2019/0326139 A1* | 10/2019 | Forderhase | H01L 21/67109 |
| 2021/0279630 A1* | 9/2021 | Li | H10N 69/00 |

OTHER PUBLICATIONS

Dang et al., "Development of 2-K Space Cryocoolers for Cooling the Superconducting Nanowire Single Photon Dector", IEEE Transactions on Applied Superconductivity, vol. 29, No. 5, Aug. 2019, pp. 1-4.

International Preliminary Report on Patentability and Written Opinion for Application No. PCT/US2021/027191, mailed Jul. 28, 2021, 17 pages.

\* cited by examiner

INTERLEAVED CRYOGENIC COOLING SYSTEM FOR QUANTUM COMPUTING APPLICATIONS

CROSS REFERENCE TO RELATED APPLICATIONS

The present application claims filing benefit of U.S. Provisional Patent Application Ser. No. 63/010,339 having a filing date of Apr. 15, 2020, which is incorporated herein by reference in its entirety.

FIELD

The present disclosure relates generally to cryogenic cooling systems, and, more particularly, to cryostat systems for quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a quantum computing system. The quantum computing system can include one or more classical processors. The quantum computing system can include one or more quantum systems comprising one or more qubits. The quantum computing system can include one or more signal lines coupling the one or more classical processors to the one or more quantum system. The quantum computing system can include a cryogenic cooling system configured to cool the one or more quantum systems to a temperature of less than about 1 kelvin. The cryogenic cooling system can include a plurality of cryogenic cooling stages. Each of the plurality of cryogenic cooling stages can include a plurality of interleaved cooling units. The plurality of interleaved cooling units can include a first cooling unit and a second cooling unit. Each of the plurality of interleaved cooling units can have an associated operating temperature range. The one or more signal lines can pass through each of the plurality of interleaved cooling units for each of the plurality of cryogenic cooling stages.

Another example aspect of the present disclosure is directed to a cryogenic cooling system. The cryogenic cooling system can include a plurality of cryogenic cooling stages. Each of the plurality of cryogenic cooling stages can include a plurality of interleaved cooling units. The plurality of interleaved cooling units can include a first cooling unit and a second cooling unit. Each of the plurality of interleaved cooling units can have an associated operating temperature range. One or more signal lines can pass through each of the plurality of interleaved cooling units for each of the plurality of cryogenic cooling stages.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Example aspects of the present disclosure are directed to cryogenic cooling system(s) (e.g., cryostat(s)) that may be employed, for example, in quantum computing applications. For instance, the cryogenic cooling system(s) can be configured to cool one or more quantum systems having a plurality of qubits operable to process and/or perform quantum computations.

Many quantum computing applications employ superconducting qubits that achieve superconductivity, or zero electrical resistance, at temperatures around approximately absolute zero, or about 0 kelvin. A challenge associated with quantum computing includes cooling quantum hardware with the superconducting qubits to a temperature at which the superconducting qubits achieve superconductivity. For example, in some cases, the superconducting qubits must be cooled to less than about 0.1 kelvin (K), such as less than about 0.01 kelvin, or 10 millikelvin (mK). Quantum computing systems can employ a cryogenic cooling system, such as a dilution refrigerator, to cool the superconducting qubits and/or other quantum hardware. The cryogenic cooling systems can form a "vacuum canister" having subsequent progressive temperature stages ranging from a temperature on the order of about 100 K to about 10 mK.

A challenge in quantum computing relates to communications between a supercooled quantum system (e.g., qubits) and a classical computing system (e.g., a binary computing system). Quantum computing systems can be at least partially controlled by a classical computing system. The classical computing system can be kept separate from the quantum computing system and can be maintained at a higher temperature than the quantum computing system such as, for instance, at about room temperature. Quantum computing systems can require fast and robust communications between the classical computing system and the quantum system (e.g., qubits) to precisely and reliably implement quantum gate operations and/or quantum state measurements. To address this requirement, many systems employ physical signal lines, such as wires, between the classical computing system and quantum system. These physical signal lines must then connect to the quantum systems and thus form a thermal conductor between the classical computing system and quantum system. The physical signal lines can reduce the efficiency of a cryogenic cooling system configured to cool the quantum system.

For example, in a staged cryogenic cooling system, the signal lines can necessarily bridge each of the progressive cryogenic stages. This can result in requiring additional cooling power (e.g., at each cryogenic stage) to mitigate the thermal conducting effect of the signal lines. While even one signal line can affect performance of the cryogenic cooling system, this problem can become more significant as quantum hardware continues to grow in complexity. For instance, the number of required signal lines can grow at least linearly, if not greater than linearly, with the number of qubits in the quantum system. For instance, in some cases, four signal lines can be required for each qubit, even if some or all of the signal lines are multiplexed.

Moreover, many quantum computing applications can require a cryogenic cooling system to operate at a near-minimum or minimum temperature of a range of possible operating temperatures at each stage of the cryogenic cooling system to avoid thermally overloading the cryogenic cooling system and/or to achieve temperatures low enough for quantum computing. As a result, cryogenic cooling systems may not achieve maximum possible cooling power at the near-minimum or minimum temperature that is required for quantum computing applications.

As one example, a mixer stage operating at about 10 mK can achieve a cooling power of about 1 microwatt whereas a theoretical maximum cooling power of the mixer stage may be on the order of about 100 microwatts at a different (e.g., higher) temperature. As another example, an example pulse tube stage operating at about 2.9 K may achieve a cooling power of about 100 milliwatts whereas the pulse tube stage, if operated at about 4.2 K, may achieve a cooling power of about 1.5 watts. Thus, in addition to reduced efficiency associated with the signal lines, cryogenic cooling systems can additionally suffer efficiency losses with respect to operating temperatures.

As used herein, "cooling power," also referred to as "cooling capacity," refers to a measure of a capability of a cooling system, such as a cooling unit and/or collection thereof, for removing heat from a cooled system. A cooling system with a cooling power of 1 W is capable of removing 1 W of power from a cooled system. The cooled system can be, for example, a system located in a cooling chamber of the cooling system, such as a quantum computing system.

According to example aspects of the present disclosure, a cryogenic cooling system can include a plurality of cryogenic cooling stages having an associated operating temperature range. Each of the plurality of cryogenic cooling stages can include a plurality of interleaved cooling units. The plurality of interleaved cooling units can include a first cooling unit and a second cooling unit. For instance, the first cooling unit can operate at a first operating temperature (e.g., within the operating temperature range) such that the first cooling unit achieves a near-maximum and/or maximum possible cooling power and the second cooling unit can operate at a second operating temperature (e.g., within the operating temperature range) that can be less than the first operating temperature, such as at about a minimum or near minimum possible temperature within the operating temperature range.

The interleaved cooling units can be interleaved and/or interwoven such that the cooling units are arranged in alternating layers or in an alternating fashion. For instance, a cryogenic cooling system can define a plurality of layers with each layer corresponding to one of the cooling units of a cooling system. Each cooling stage of the cryogenic system can include a first cooling unit associated with a first cooling system and a second cooling unit associated with a second cooling system. The layers of the cooling systems in the cryogenic system can be arranged such that cooling units associated with the first cooling system and cooling units associated with the second cooling system are arranged in alternating fashion though one or more of a plurality of the cooling stages of the cryogenic cooling system. Example aspects of the present disclosure are discussed with two interleaved cooling units (e.g., a first cooling unit and a second cooling unit) for the purposes of illustration. One of ordinary skill in the art will understand that any suitable number of interleaved cooling units can be included in the plurality of interleaved cooling units. For instance, some or all of the cryogenic cooling stages can include three interleaved cooling units, four interleaved cooling units, or any other number of interleaved cooling units. Furthermore, each of the plurality of interleaved cooling units can be configured to operate at a different operating temperature within the operating temperature range for the cryogenic cooling stage.

Aspects of the present disclosure can provide for a number of technical effects and benefits. For instance, aspects of the present disclosure can provide for improved cooling efficiency of cryogenic cooling systems. As one example, some embodiments can provide for an increase in cooling efficiency of from about 10 to about 100 times in cooling efficiency, while requiring only about double the cryogenic resources. As such, aspects of the present disclosure can provide for improved scalability of cryogenic cooling systems with respect to increasingly thermally taxing loads. This, for example, can be beneficial to match growing complexities of quantum computing systems. As one example, systems and methods according to example aspects of the present disclosure can cool a greater number of qubits per unit of cryogenic resource (e.g., per dilution refrigerator). Additionally and/or alternatively, systems and methods according to example aspects of the present disclosure can require a fewer amount of cryogenic resources to cool a certain number of qubits. Systems and methods as described herein can be particularly beneficial in the case where a number of signal lines pass through each of a plurality of cryogenic cooling stages, especially a large number of signal lines (e.g., a number of signal lines associated with greater than 10 qubits).

As used herein, the use of the term "about" or "approximately" in conjunction with a stated numerical value is intended to refer to within 10% of the stated numerical value. As used herein, "near maximum" refers to within 10% of a maximum. As used herein, "near minimum" refers to within 10% of a minimum.

With reference now to the FIGS., example embodiments of the present disclosure will be discussed in further detail.

Figure 1:
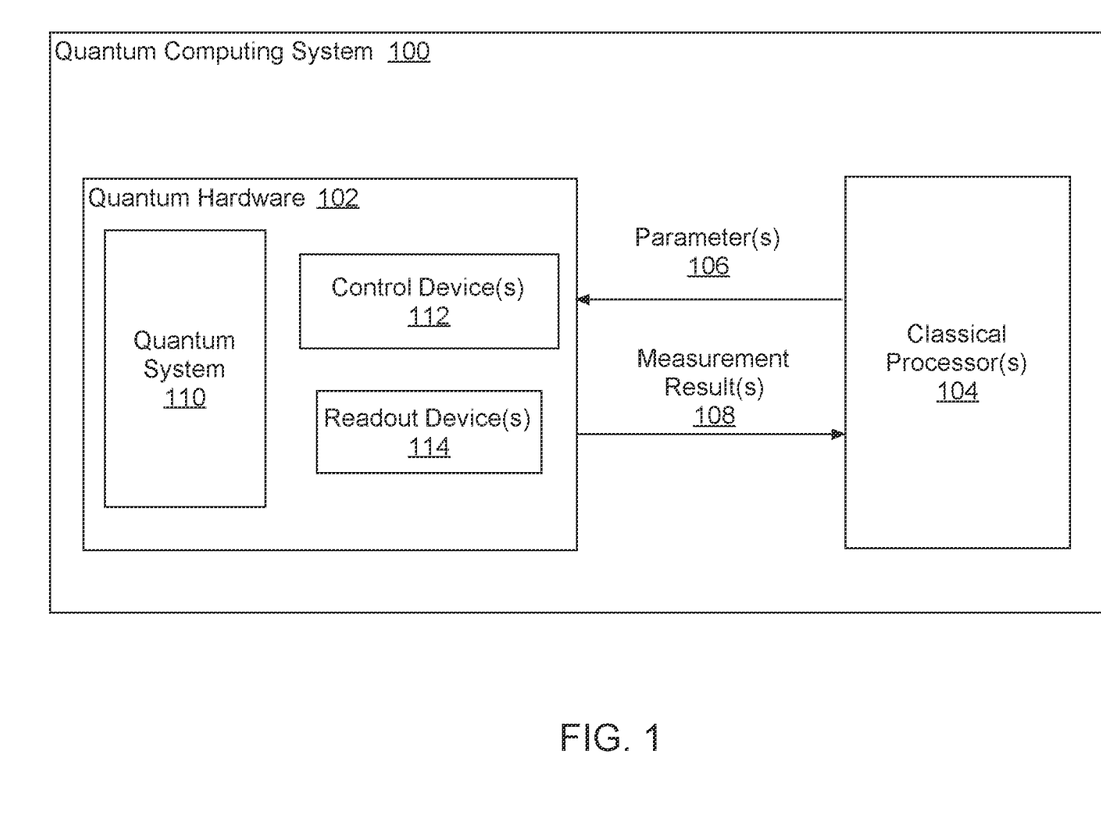
FIG. 1 depicts an example quantum computing system according to example embodiments of the present disclosure.

FIG. 1 depicts an example quantum computing system 100. The example system 100 is an example of a system implemented as a classical or quantum computer program on one or more classical computers or quantum computing devices in one or more locations, in which the systems, components, and techniques described below can be implemented. FIG. 1 depicts an example quantum computing system that can be used to implement aspects of the present disclosure. Those of ordinary skill in the art, using the disclosures provided herein, will understand that other quantum computing structures or systems can be used without deviating from the scope of the present disclosure.

The system 100 includes quantum hardware 102 in data communication with one or more classical processor(s) 104. For instance, quantum hardware 102 can represent and/or manipulate information using qubits. A qubit can be or include any suitable quantum device that enables the superposition of multiple states, e.g., data in both the "0" and "1" state. As one example, a qubit can be or include a unit of superconducting material, such as superconducting material that achieves superconductivity in temperatures below about 10 mK.

The quantum hardware 102 can include components for performing quantum computation. For example, the quantum hardware 102 can include a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The classical processor(s) 104 can be binary processors, such as processors that operate on data represented as a plurality of bits. As one example, bits can be represented by a voltage differential between a low voltage (e.g., 0V) and a high voltage (e.g., 5V) at a point of reference, such as a memory cell, circuit node, etc. The low voltage can be associated with a "0" state and the high voltage can be associated with a "1" state. The classical processor(s) 104 can be configured to, in addition to any other suitable function(s) of the classical processor(s) 104, control the quantum hardware 102. For instance, the classical processor(s) 104 can be coupled to the quantum hardware 102 (e.g., by signal lines) and/or configured to send control signals to perform quantum operations using the quantum hardware 102. As one example, the classical processor(s) 104 can be configured to send control signals that implement quantum gate operations at the quantum hardware 102 (e.g., by control device(s) 112). Additionally and/or alternatively, the classical processor(s) 104 can be configured to send control signals that cause the quantum hardware 102 to perform quantum state measurements and/or provide the quantum state measurements to the classical processor(s) 104 (e.g., by readout device(s) 114). For example, the classical processor(s) 104 can receive measurements of the quantum system 110 that can be interpretable by the classical processor(s) 104.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits.

Quantum circuits may be constructed and applied to the register of qubits included in the quantum system 110 via multiple signal lines (e.g., signal lines 120 of FIG. 2) that are coupled to one or more control devices 112. Example control devices 112 that operate on the register of qubits can be used to implement quantum logic gates or circuits of quantum logic gates, e.g., Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines (e.g., signal lines 120 of FIG. 2) to generate magnetic fields to adjust a frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 110 through physical control parameters (e.g., microwave pulse) that are sent through wires included in the quantum hardware 102. Further examples of control devices include arbitrary waveform generators, wherein a DAC creates the signal.

The readout device(s) 114 may be configured to perform quantum measurements on the quantum system 110 and send (e.g., by signal lines 120 of FIG. 2) measurement results 108 to the classical processors 104. In addition, the quantum hardware 102 may be configured to receive data (e.g., by signal lines 120 of FIG. 2) specifying physical control parameter values 106 from the classical processors 104. The quantum hardware 102 may use the received physical control parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

The system 100 includes control device(s) 112. Control device(s) 112 can operate the quantum hardware 102. For example, control device(s) 112 can include a waveform generator configured to generate control pulses according to example aspects of the present disclosure.

In some implementations, the control device(s) 112 may include a data processing apparatus and associated memory. The memory may include a computer program having instructions that, when executed by the data processing apparatus, cause the data processing apparatus to perform one or more functions described herein, such as applying a control signal to a qubit 134/136 and/or to a tunable coupler 138.

Figure 2:
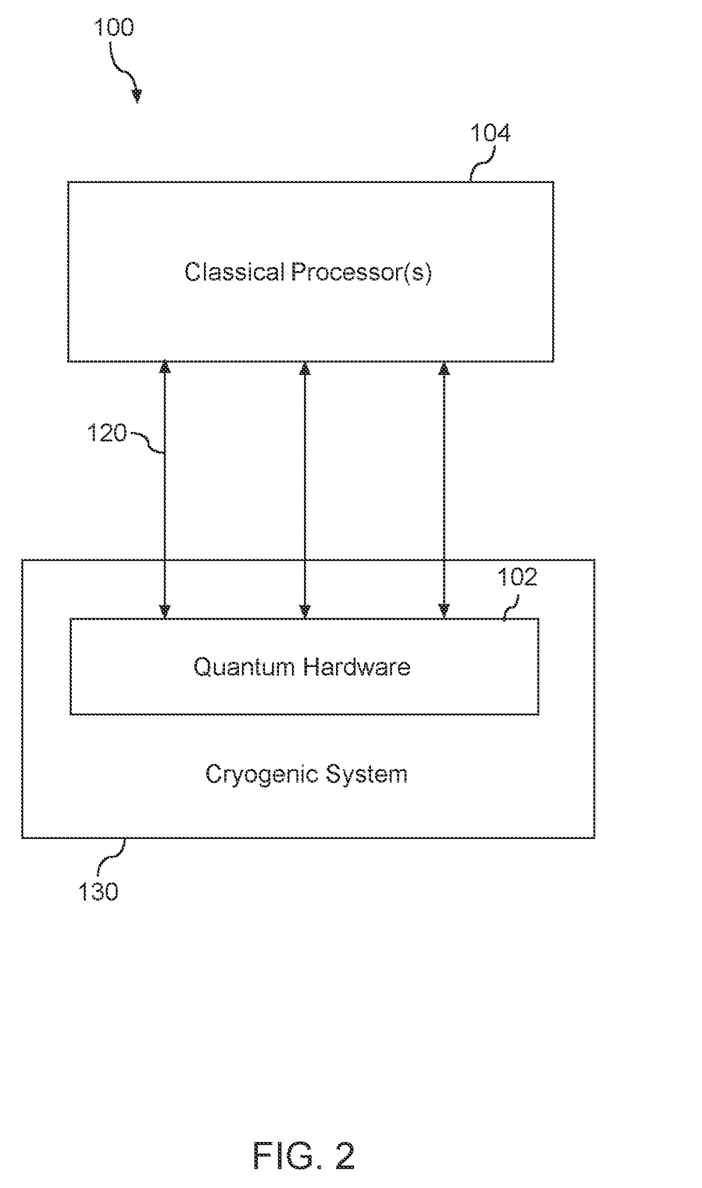
FIG. 2 depicts an example quantum computing system according to example embodiments of the present disclosure.

FIG. 2 depicts an example quantum computing system 100 according to example embodiments of the present disclosure. As illustrated in FIG. 2, quantum hardware 102, such as, but not limited to, quantum system 110, control device(s) 112, readout device(s) 114, and/or any other suitable components of quantum hardware 102 discussed with regard to FIG. 1, can be located within cryogenic cooling system 130. Additionally and/or alternatively, classical processor(s) 104 can be located outside cryogenic cooling system 130. For instance, cryogenic cooling system 130 can be configured to cool quantum hardware 102. Additionally and/or alternatively, classical processor(s) 104 are not cooled by cryogenic cooling system 130. For instance, classical processor(s) 104 can operate at temperatures around room temperature (e.g., around 300 kelvin) and/or temperatures around about 100 kelvin, whereas quantum hardware 102 can operate at temperatures around absolute zero (e.g., less than about 1 kelvin) which can thus require cooling by cryogenic cooling system 130 to effectively operate.

Quantum computing system 100 can include signal line(s) 120. The signal line(s) 120 can couple classical processor(s) 104 to quantum hardware 102. For instance, as classical processor(s) 104 and quantum hardware 102 can be in signal communication, such as to transmit parameter(s) 106 and/or measurement result(s) 108 of FIG. 1 in addition to any other suitable signals, the classical processor(s) 104 can be coupled to quantum hardware 102 by signal lines 120. For instance, signal lines 120 can be or can include any suitable physical communicative coupling(s) (e.g., one or more wires) that is/are configured to couple quantum hardware 102 and classical processor(s) 104. Generally, signal lines 120 include physical connections to allow for faster and/or more robust communication between quantum hardware 102 and classical processor(s) 104. As illustrated in FIG. 2, signal lines 120 can be at least partially located in cryogenic cooling system 130 to provide coupling to quantum hardware 102.

Figure 3:
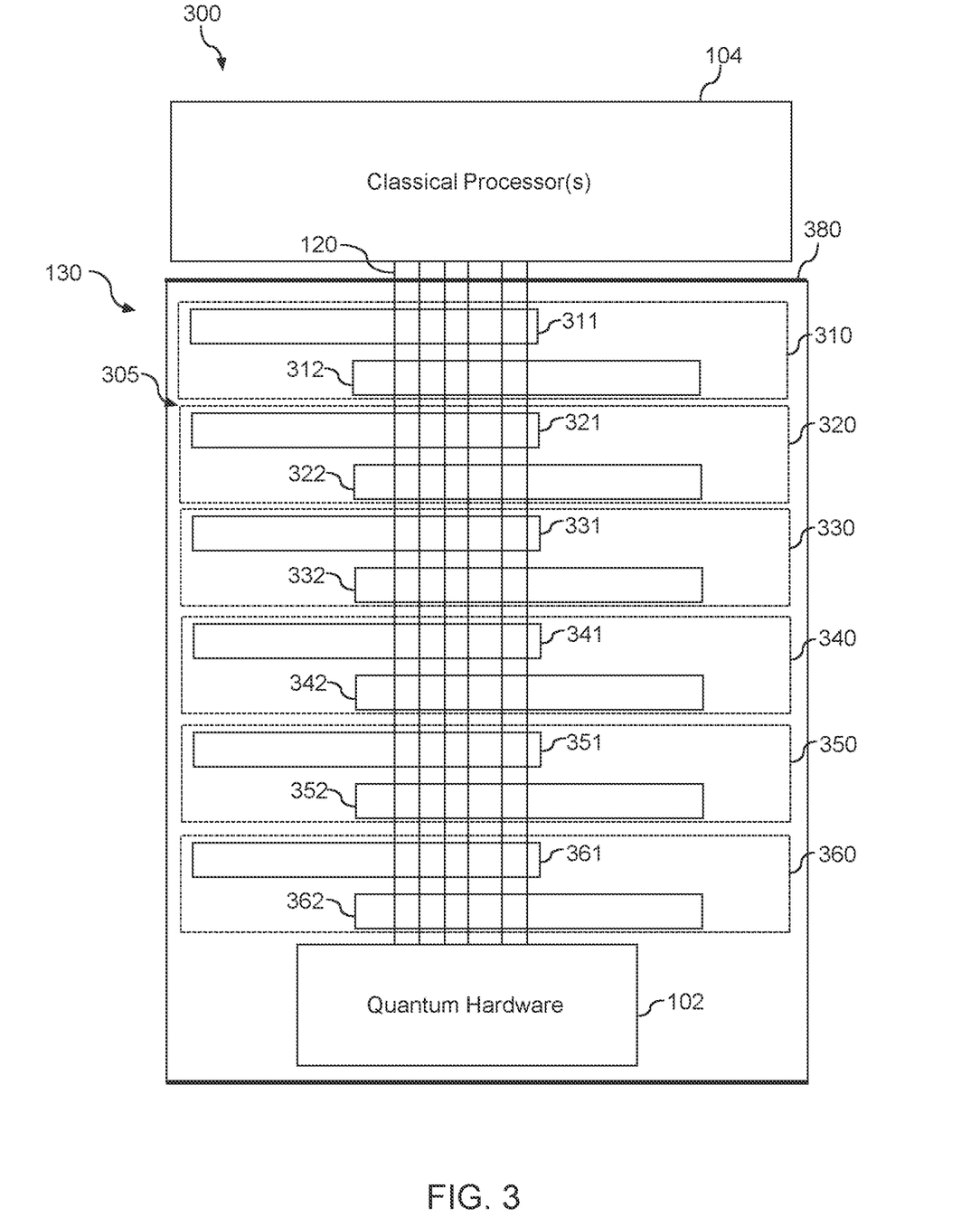
FIG. 3 depicts an example quantum computing system with a cryogenic cooling system including a plurality of cryogenic cooling stages according to example embodiments of the present disclosure.

FIG. 3 depicts an example quantum computing system 300 according to example embodiments of the present disclosure. The quantum computing system 300 can include a cryogenic cooling system 130. The cryogenic cooling system 130 can be configured to cool the quantum hardware 102. For instance, the cryogenic cooling system 130 can cool the quantum hardware 102 to a temperature below about 1 kelvin. As one example, the cryogenic cooling system can cool the quantum hardware 102 to a temperature at which the quantum hardware 102 (e.g., quantum system 110) achieves superconductivity, such as at temperatures below about 10 mK.

As illustrated in FIG. 3, the cryogenic cooling system 130 can include a plurality of cryogenic cooling stages 305. The cryogenic cooling stages 305 can include, for example, first stage 310, second stage 320, third stage 330, fourth stage 340, fifth stage 350, and/or sixth stage 360. Each of the plurality of cryogenic cooling stages 305 can include a plurality of interleaved cooling units. For example, each of the plurality of interleaved cooling units can include a first cooling unit (e.g., 311, 321, 331, 341, 351, 361) and a second cooling unit (e.g., 312, 322, 332, 342, 352, 362).

The plurality of interleaved cooling units can be independently operable such that some or all of the first cooling units (e.g., 311, 321, 331, 341, 351, 361) are operated independently from some or all of the second cooling units (e.g., 312, 322, 332, 342, 352, 362). For instance, some or all of the cooling unit(s) (e.g., the first and/or second cooling units) can have an operating temperature range defining a plurality of possible operating temperatures including a maximum operating temperature and/or a minimum operating temperature. For example, operating parameters of a cooling unit, such as, for example, coolant flow through the cooling unit, can be modified such that the cooling unit operates at one of the plurality of possible operating temperatures within the operating temperature range. Generally, a cooling unit can have an effective cooling power that is based at least in part on the operating temperature. For instance, a cooling unit can operate with a higher effective cooling power at a first temperature in the operating temperature range than at a second temperature in the operating temperature range. Furthermore, in some cases, a cooling unit can have a maximum cooling power associated with a particular operating temperature, or subset of operating temperatures, in the operating temperature range. Cooling power can vary with operating temperature for a given cooling unit, and may define one or more local optima (e.g., local maxima) including an absolute maximum.

According to example aspects of the present disclosure, each of the first cooling units (e.g., 311, 321, 331, 341, 351, 361) can operate at a first operating temperature (e.g., within the operating temperature range) such that the first cooling unit achieves a greater amount of cooling power than the second cooling unit. For example, the first cooling unit can achieve a near-maximum and/or maximum possible cooling power. Additionally and/or alternatively, each of the second cooling units (e.g., 312, 322, 332, 342, 352, 362) can operate at a second operating temperature (e.g., within the operating temperature range) that can be a lower operating temperature. For example, the lower operating temperature can be less than (e.g., lower than) the first operating temperature, such as at about a minimum or near minimum possible temperature within the operating temperature range.

In one example, the cryogenic cooling system 130 can include first stage 310. First stage 310 can include, for example, first cooling unit 311 and/or second cooling unit 312. First cooling unit 311 can be interleaved with second cooling unit 312. The first stage 310 can be associated with operating temperatures in the range of about 40 kelvin to about 60 kelvin. For instance, in some embodiments, the first cooling unit 311 can be configured to operate at about 60 kelvin. Additionally and/or alternatively, in some embodiments, the second cooling unit 312 can be configured to operate at about 40 kelvin. For instance, in some embodiments, the first stage 310 can be a first stage pulse tube. The first stage pulse tube can be associated with operating temperatures in the range of about 40 kelvin to about 60 kelvin, such as about 50 kelvin. In some embodiments, a first intermediate clamp (not illustrated) may be included prior to the first stage 310. For instance, the first intermediate clamp can be associated with an operating temperature of about 150 kelvin.

Additionally and/or alternatively, the cryogenic cooling system 130 can include second stage 320. second stage 320 can include, for example, the first cooling unit 321 and/or second cooling unit 322. First cooling unit 321 can be interleaved with second cooling unit 322. The second stage 320 can be associated with operating temperatures in the range of about 10 kelvin to about 20 kelvin. For instance, in some embodiments, first cooling unit 321 can be configured to operate at about 20 kelvin. Additionally and/or alternatively, in some embodiments, the second cooling unit 322 can be configured to operate at about 10 kelvin. For instance, in some embodiments, second stage 320 can be a second intermediate clamp. The second intermediate clamp can be associated with operating temperatures in the range of about 10 kelvin to about 20 kelvin, such as about 15 kelvin.

Additionally and/or alternatively, the cryogenic cooling system 130 can include third stage 330. Third stage 330 can include, for example, first cooling unit 331 and/or second cooling unit 332. First cooling unit 331 can be interleaved with second cooling unit 332. The third stage 330 can be associated with operating temperatures in the range of about 2.5 kelvin to about 4.2 kelvin. For instance, in some embodiments, the first cooling unit 331 can be configured to operate at about 4.2 kelvin. Additionally and/or alternatively, in some embodiments, the second cooling unit 332 can be configured to operate at about 2.5 kelvin. For instance, in some embodiments, the third stage 330 can be a second stage pulse tube. The second stage pulse tube can be associated with operating temperatures in the range of about 2.5 kelvin to about 4.2 kelvin, such as about 3 kelvin.

Additionally and/or alternatively, the cryogenic cooling system 130 can include fourth stage 340. Fourth stage 340 can include, for example, first cooling unit 341 and/or second cooling unit 342. First cooling unit 341 can be interleaved with second cooling unit 342. The fourth stage 340 can be associated with operating temperatures in the range of about 600 millikelvin to about 800 millikelvin. For instance, in some embodiments, the first cooling unit 341 can be configured to operate at about 800 millikelvin. Additionally and/or alternatively, in some embodiments, the second cooling unit 342 can be configured to operate at about 600 millikelvin. For instance, in some embodiments, the fourth stage 340 can be a still. The still may be configured to evaporate helium, such as $^3$He. The still can be associated with operating temperatures in the range of about 600 millikelvin to about 800 millikelvin, such as about 700 millikelvin.

Additionally and/or alternatively, the cryogenic cooling system 130 can include fifth stage 350. Fifth stage 350 can include, for example, first cooling unit 351 and/or second cooling unit 352. First cooling unit 351 can be interleaved with second cooling unit 352. The fifth stage 350 can be associated with operating temperatures in the range of about 100 millikelvin to about 300 millikelvin. For instance, in some embodiments, the first cooling unit 351 can be configured to operate at about 300 millikelvin. Additionally and/or alternatively, in some embodiments, the second cooling unit 352 can be configured to operate at about 100 millikelvin. For instance, in some embodiments, the fifth stage 350 can be an intermediate heat exchanger. The intermediate heat exchanger can be associated with operating temperatures in the range of about 100 millikelvin to about 300 millikelvin, such as about 150 millikelvin.

Additionally and/or alternatively, the cryogenic cooling system 130 can include sixth stage 360. Sixth stage 360 can include, for example, the first cooling unit 361 and/or second cooling unit 362. First cooling unit 361 can be interleaved with second cooling unit 362. The sixth stage 360 can be associated with operating temperatures in the range of about 10 millikelvin to about 100 millikelvin. For instance, in some embodiments, the first cooling unit 361 can be configured to operate at about 100 millikelvin. Additionally and/or alternatively, in some embodiments, the second cooling unit 362 can be configured to operate at about 10 millikelvin. Additionally and/or alternatively, in some embodiments, the second cooling unit 362 can operate below about 10 millikelvin, such as at about zero kelvin. For instance, in some embodiments, the sixth stage can be a mixing chamber stage. The mixing chamber stage can be associated with operating temperatures in the range of about 10 millikelvin to about 100 millikelvin, such as less than about 20 millikelvin.

In some embodiments, the first and second cooling units in each of the plurality of cryogenic cooling stages 305 can be identical and/or nearly identical cooling units. For instance, in some embodiments, a first cooling unit (e.g., 311) and a respective second cooling unit (e.g., 312) of one cooling stage of the plurality of cryogenic cooling stages 305 can be structurally identical. For example, the first cooling unit (e.g., 311) and the respective second cooling unit (e.g., 312) may be configured to operate at different temperatures (e.g., by adjusting a coolant flow through each cooling unit) but may otherwise be identical. In some embodiments, the first cooling unit (e.g., 311) and the second cooling unit (e.g., 312) are not necessarily identical, but may share at least some degree of similarity. For example, the first cooling unit (e.g., 311) and respective second cooling unit (e.g., 312) may perform the same function within the respective cryogenic cooling stage (e.g., 310), respectively.

The first cooling unit (e.g., 311) and respective second cooling unit (e.g., 312) may be corresponding cooling units. The plurality of cryogenic cooling stages 305 can thus include interleaved cooling units such that the corresponding cooling units are adjacent in a sequential ordering of the plurality of cryogenic cooling stages 305. As one example, the cryogenic cooling stages 305 can be arranged in the sequential ordering based on operating temperatures of the cryogenic cooling stages 305. Both the first cooling unit (e.g., 311) and the respective second cooling unit (e.g., 312) may have operating temperatures that are bounded by operating temperatures of both the first and second cooling units of a preceding cryogenic cooling stage of the plurality of cryogenic cooling stages and the first and second cooling units of a subsequent cryogenic cooling stage of the plurality of cryogenic cooling stages 305. For example, operating temperatures of first cooling unit 331 and second cooling unit 332 of stage 330 may be bounded by operating temperatures of the first and second cooling units of stage 320 and stage 340.

The signal line(s) 120 can be at least partially located within the cryogenic cooling system 130. For instance, the signal line(s) 120 can be at least partially located within some or all of the cryogenic cooling stages 305 of the cryogenic cooling system 130. As one example, the signal line(s) 120 can pass through each of the plurality of interleaved cooling units for each of the plurality of cryogenic cooling stages 305. The signal line(s) 120 can thus form a thermal coupling between the classical processor(s) 104 and quantum hardware 102. Aspects of the present disclosure can be beneficial in reducing thermal impacts of the signal line(s) 120.

Thus, the temperature requirements of quantum computing can be achieved by the cryogenic cooling system 130. Additionally, the cryogenic cooling system 130 can have improved efficiency over existing cryogenic cooling systems. Notably, although the systems and methods of the present disclosure can require about double the cryogenic resources compared to existing systems, example systems and methods of the present disclosure can unexpectedly achieve cooling capacity increases of at least 10 times the capacity of existing systems. In some embodiments, these cooling capacity increases can be as much as about 100 times the capacity of existing systems.

In some embodiments, the quantum computing system 300 (e.g., the cryogenic cooling system 130) can include a vacuum canister 380. For instance, in some embodiments, each of the plurality of cryogenic cooling stages 305 and/or the quantum hardware 102 can be located in a single (e.g., the same) vacuum canister 380. Vacuum canister 380 can include a plurality of ordered shelves (not illustrated). For instance, each of the plurality of shelves can be configured to house one or more of the cryogenic cooling stages 305, such as a first cooling unit (e.g., 311) and a second cooling unit (e.g., 312). For instance, a first cooling unit (e.g., 311) and a respective second cooling unit (e.g., 312) with respect to a cryogenic cooling stage (e.g., 310) can be located on the same shelf of the plurality of shelves. In some embodiments, a first cooling unit (e.g., 311) can be located on a first shelf and a respective second cooling unit (e.g., 312) can be located on a second shelf that is adjacent to the first shelf. The vacuum canister 380 can be located in a vacuum and/or otherwise define a vacuum for the plurality of cryogenic cooling stages 305 and/or the quantum hardware 102. For example, an airtight seal can be formed around the vacuum canister 380 and any air in the vacuum canister 380 can be purged from the vacuum canister 380.

Figure 4:
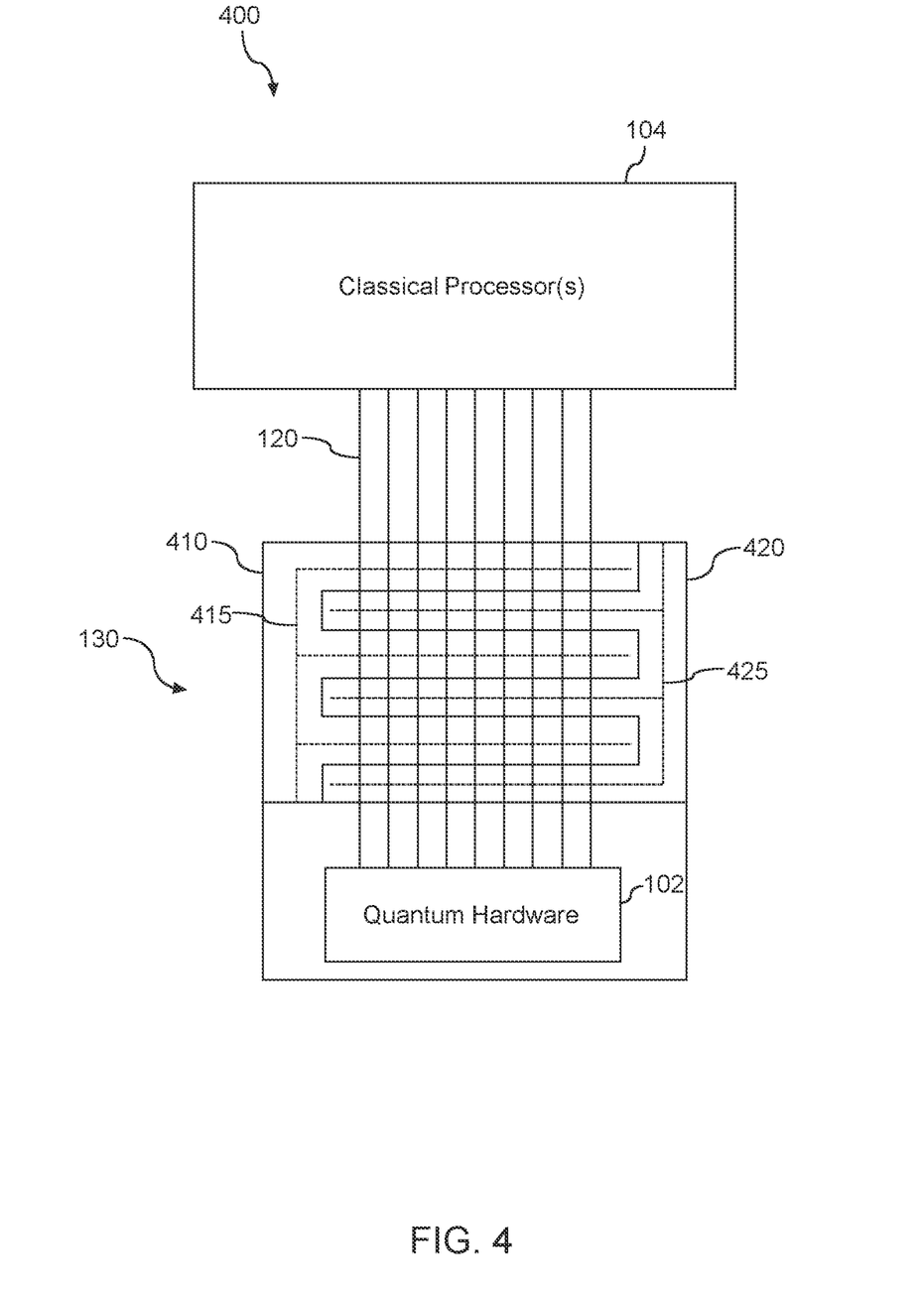
FIG. 4 depicts an example quantum computing system having a cryogenic cooling system having a first cooling assembly and a second cooling assembly according to example embodiments of the present disclosure.

FIG. 4 depicts an example quantum computing system 400 according to example embodiments of the present disclosure. As illustrated in FIG. 4, quantum computing system 400 can include a cryogenic cooling system 130 having a first cooling assembly 410 and a second cooling assembly 420. The first cooling assembly 410 and the second cooling assembly 420 can be interleaved such that the first cooling assembly 410 and the second cooling assembly 420 include a plurality of cryogenic cooling stages having interleaved cooling units. For instance, the first cooling assembly 410 and the second cooling assembly 420 can define a plurality of cryogenic cooling stages (e.g., 305, FIG. 3). Each of the plurality of cryogenic cooling stages can include a plurality of interleaved cooling units (e.g., 311, 312, FIG. 3). For example, the plurality of interleaved cooling units can include a first cooling unit from the first cooling assembly 410 and a second cooling unit from the second cooling assembly 420. The plurality of interleaved cooling units can be independently operable such that the first cooling assembly 410 (e.g., the first cooling units) is operated independently from the second cooling assembly 420 (e.g., the second cooling assembly). As one example, the first cooling assembly 410 and/or the second cooling assembly 420 can each be an independently operable dilution refrigerator system.

As one example, the first and second cooling units can be corresponding stages of separately operating but interleaved cryogenic cooling assemblies 410, 420 (e.g., dilution refrigerators) having different configured operation temperatures at some or all stages (e.g., stages 310, 320, 330, 340, 350, 360 of FIG. 3). For instance, in some embodiments, the first cooling units of each of the plurality of cryogenic cooling stages can collectively define first cooling assembly 410, and/or the second cooling units of each of the plurality of cryogenic cooling stages can collectively define second cooling assembly 420, where the first and second cooling assemblies 410, 420 can be independently operable. For example, each of the first cooling assembly 410 and/or the second cooling assembly 420 can be an independently operable dilution refrigerator system. As an example, at least one of the first cooling unit or the second cooling unit of any of the plurality of interleaved cooling units in cooling assemblies 410, 420 can include one or more dilution refrigerator stages. Each cooling assembly 410, 420 may comprise a multi-stage cryogenic apparatus, such that each stage of the cooling assembly 410, 320 may be associated with one or more of the cryogenic cooling stages 305 of the cryogenic cooling system 130.

In some embodiments, separate coolant loops 415, 425 can be associated with the first cooling assembly 410 (e.g., the first cooling units) and the second cooling assembly 420 (e.g., the second cooling units). For instance, a first coolant loop 415 can be associated with the first cooling assembly 410 and a second coolant loop 425 can be associated with the second cooling assembly 420. The first coolant loop 415 and second coolant loop 425 may be independent from one another, such that, for example, coolant from one loop does not mix with coolant from the other.

In some embodiments, parameters of the coolant flow in the first and/or second coolant loops 415, 425 can vary an operating temperature of the first and/or second cooling assemblies 410, 420. For example, a greater coolant flow (e.g., a faster flow and/or greater volumetric flow) can result in a decreased operating temperature. In cases where the first cooling assembly 410 and/or the second cooling assembly 420 are dilution refrigerator systems, for example, a first coolant loop 415 of 4He and/or $^4$He can be included in the first cooling assembly 410 (e.g., for each of the first cooling units) and a second coolant loop 425 of 4He and/or $^4$He can be included in the second cooling assembly 420 (e.g., for each of the second cooling units).

The second coolant loop 425 can be independently operable from the first coolant loop 415. As one example, a flow of coolant in the first coolant loop 415 can be greater than and/or less than a flow of coolant in the second coolant loop 425. As one example, the flow of coolant in the first coolant loop 415 can be such that the first cooling assembly 410 (e.g., each of the first cooling units) achieves a maximum cooling power (e.g., individually and/or aggregate among some or all of the first coolant units). Additionally and/or alternatively, the flow of coolant in the second coolant loop 425 can be such that the second cooling assembly (e.g., each of the second cooling units) achieves a lowest operating temperature within an operating temperature range.

In some embodiments, the first cooling assembly 410 and the second cooling assembly 420 (e.g., a first cooling unit and a respective second cooling unit respective to a stage of the plurality of cryogenic cooling stages) can be structurally identical. For example, the first cooling assembly 410 and the second cooling assembly 420 may be configured to operate at different temperatures (e.g., by adjusting a coolant flow in the first and/or second coolant loops 415, 425) but may otherwise be identical. In some embodiments, the first cooling assembly 410 and the second cooling assembly 420 are not necessarily identical, but may share at least some degree of similarity. For example, a first cooling unit and a respective second cooling unit may perform the same function within the first and second cooling assemblies 410, 420, respectively. The first cooling unit and respective second cooling unit may be corresponding cooling units.

The cryogenic cooling system 130 can thus include interleaved cooling assemblies 410, 420. For instance, the cryogenic cooling system 130 can define a plurality of layers, with each layer corresponding to one of the cooling units of a cooling assembly (e.g., 410, 420). Each cooling stage of the cryogenic system can include a first cooling unit associated with a first cooling system and a second cooling unit associated with a second cooling system. The layers of the cooling systems in the cryogenic system can be arranged such that cooling units associated with the first cooling assembly 410 and cooling units associated with the second cooling assembly 420 are arranged in alternating fashion though one or more of a plurality of the cooling stages of the cryogenic cooling system 130. As another example, corresponding cooling units can be adjacent in a sequential ordering of the plurality of cryogenic cooling stages. As one example, the cryogenic cooling stages can be arranged in the sequential ordering based on operating temperatures of the cryogenic cooling stages. Both the first cooling unit and the respective second cooling unit may have operating temperatures that lie between both the first and second cooling units of a preceding cryogenic cooling stage of the plurality of cryogenic cooling stages and the first and second cooling units of a subsequent cryogenic cooling stage of the plurality of cryogenic cooling stages.

Figure 5:
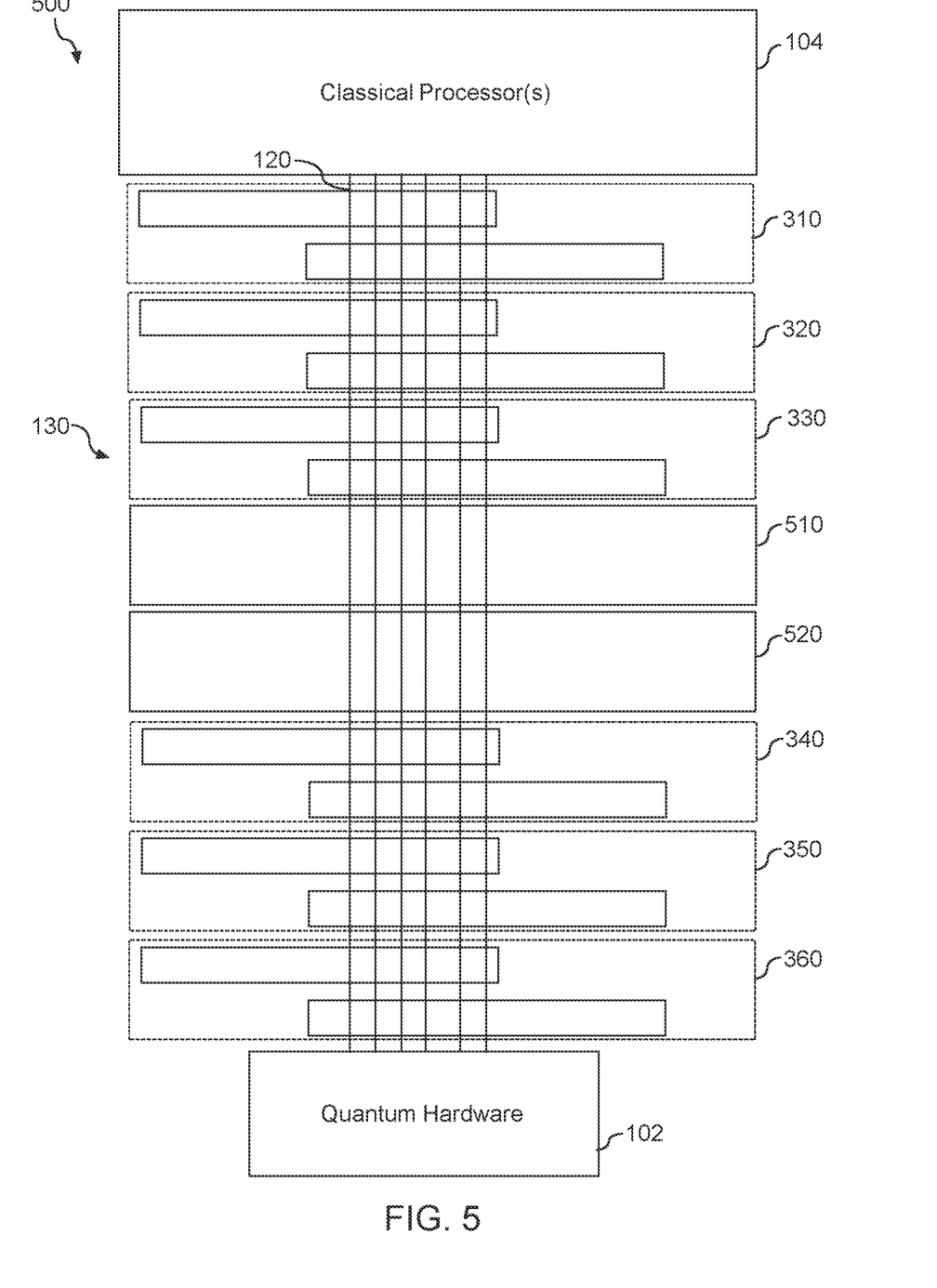
FIG. 5 depicts an example quantum computing system with a cryogenic cooling system including a plurality of cryogenic cooling stages according to example embodiments of the present disclosure.

FIG. 5 depicts an example quantum computing system 500 according to example embodiments of the present disclosure. As illustrated in FIG. 5, quantum computing system 500 (e.g., cryogenic cooling system 130) can include a Joule-Thompson cooling stage 510. Additionally and/or alternatively, quantum computing system 500 (e.g., cryogenic cooling system 130) can include a helium liquefier stage 520.

For instance, in some embodiments, the quantum computing system 500 (e.g., cryogenic cooling system 130) can include a Joule-Thompson cooling stage 510. The Joule-Thompson cooling stage 510 can have an operating temperature of about 2 kelvin. For example, the Joule-Thompson cooling stage 510 can expand a fluid, such as a liquid and/or gas, or combination thereof, across constant enthalpy (e.g., a valve) to cool the fluid and/or the surroundings of the fluid. In some embodiments, the Joule-Thompson cooling stage 510 can include a first Joule-Thompson cooling unit and a second Joule-Thompson cooling unit that are interleaved according to example aspects of the present disclosure. For example, the Joule-Thompson cooling stage can share at least a portion of a coolant loop (e.g., 415, 425) with a first cooling unit and/or a second cooling unit (e.g., of first and/or second cooling assemblies 410, 420 of FIG. 4). Additionally and/or alternatively, the Joule-Thompson cooling stage can include a coolant loop that does not cool either or both of a first cooling unit and/or a second cooling unit.

In some embodiments, the quantum computing system 500 (e.g., cryogenic cooling system 130) can include a helium liquefier stage 520. The helium liquefier stage 520 can have an operating temperature of about 1 kelvin. For example, the helium liquefier stage 520 can operate on a closed coolant loop that can be separated from the coolant loop(s) of the interleaved stages (e.g., 415, 425). The helium liquefier stage 520 can liquefy (e.g., condense) and vaporize helium (e.g., $^3$He and/or $^4$He) to provide a cooling effect. In some embodiments, the helium liquefier stage 520 can include a first helium liquefier cooling unit and a second helium liquefier cooling unit that are interleaved according to example aspects of the present disclosure. In some embodiments, the helium liquefier cooling stage can share at least a portion of a coolant loop (e.g., 415, 425) with a first cooling unit and/or a second cooling unit (e.g., of first and/or second cooling assemblies 410, 420 of FIG. 4). Additionally and/or alternatively, the helium liquefier cooling stage can include a coolant loop that does not cool either or both of a first cooling unit and/or a second cooling unit.

Figure 6A:
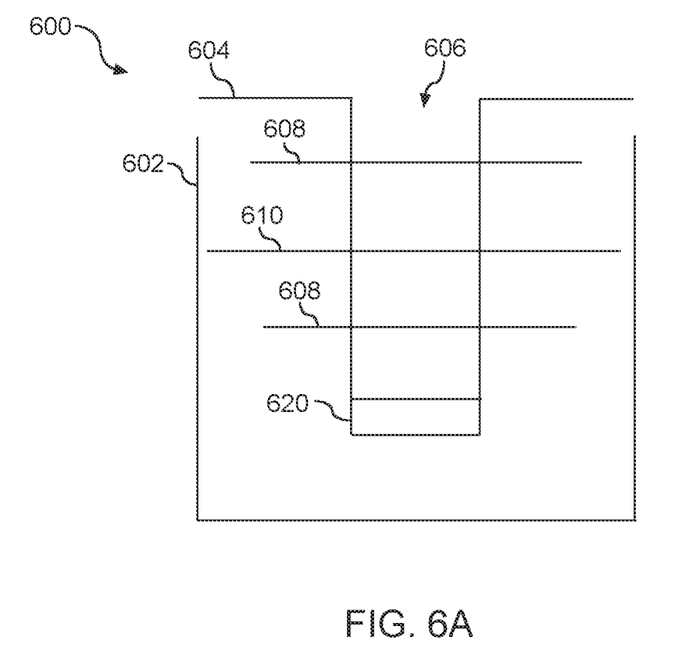
FIG. 6A depicts an example vacuum canister according to example embodiments of the present disclosure.

FIG. 6A depicts an example vacuum canister 600 according to example embodiments of the present disclosure. Vacuum canister 600 can include cover 602 and suspension 604. For instance, suspension 604 can be movable relative to cover 602 to form an airtight seal with cover 602. In some embodiments, cover 602 can be stationary (e.g., located immovably, such as on the ground) and suspension 604 can be movable to form the airtight seal. In some embodiments, suspension 604 can be stationary and cover 602 can be movable to form the airtight seal. In some embodiments, both cover 602 and suspension 604 can be movable to form the airtight seal.

Vacuum canister 600 can be configured to house a cryogenic cooling system (not illustrated). For instance, vacuum canister 600 may be configured to house any suitable quantum computing system, such as any of the quantum computing systems 100, 300, 400, 500 depicted in FIGS. 1-5. As one example, and referring to FIG. 3, vacuum canister 600 can be employed as vacuum canister 380. For instance, in some embodiments, each of the plurality of cryogenic cooling stages 305 and/or the quantum hardware 102 can be located in vacuum canister 600.

Vacuum canister 600 can include signal line cavity 606. For instance, signal line cavity 606 can be configured to house signal lines 120 (FIGS. 1-5). As one example, signal line cavity 606 can span from an exterior of the vacuum canister 600 (e.g., from classical processor(s) 104 of FIG. 1) to cryostat chamber 620. Cryostat chamber 620 can be maintained at a temperature of less than about one kelvin (e.g., less than about 10 mK) by a cryogenic cooling system housed by vacuum canister 600. For instance, quantum hardware (e.g., quantum hardware 102 of FIG. 1) can be housed in the cryostat chamber 620.

Vacuum canister 600 can include a plurality of ordered shelves 608. For instances, each of the plurality of shelves can be configured to house one or more of the cryogenic cooling stages 305, such as a first cooling unit (e.g., 311, FIG. 3) and a second cooling unit (e.g., 312, FIG. 3). For instance a first cooling unit (e.g., 311, FIG. 3) and a respective second cooling unit (e.g., 312, FIG. 3) with respect to a cryogenic cooling stage (e.g., 310, FIG. 3) can be located on a same shelf of the plurality of shelves. Thus, suspension 604 can define a vacuum with cover 602 for the plurality of cryogenic cooling stages 305 and/or the quantum hardware 102. For example, an airtight seal can be formed by the vacuum canister 600 and any air in the vacuum canister 600 (e.g., between cover 602 and suspension 604) can be purged from the vacuum canister 600.

In some embodiments, one or more thermal radiation shields 610 can be positioned proximate to and/or inside the vacuum canister 600. For instance, the thermal radiation shield(s) 610 can be configured to block thermal radiation from outside the vacuum canister 600 and/or from inside the vacuum canister 600, such as blackbody radiation from components within and/or comprising the vacuum canister 600, such as, for example, cover 602, shelves 608, and any cooling units inside vacuum canister 600. For example, thermal radiation shields 610 can be positioned between the cryogenic cooling stages (e.g., between the shelves 608) to block thermal radiation from a prior stage. In some embodiments, the thermal radiation shields 610 can also act as shelves 608.

Figure 6B:
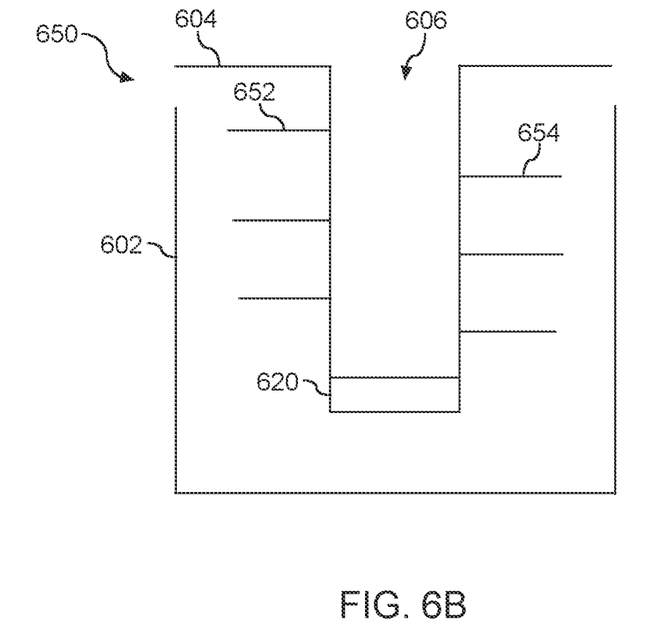
FIG. 6B depicts an example vacuum canister according to example embodiments of the present disclosure.

FIG. 6B depicts a vacuum canister 650 according to example embodiments of the present disclosure. Vacuum canister 650 can include components discussed with respect to FIG. 6A, such as, for example, cover 602, suspension 604, signal line cavity 606, cryostat chamber 620, and shields 610 (not illustrated). The vacuum canister 650 can include offset shelves 652 and 654. For instance, in some embodiments, a first cooling unit (e.g., 311) can be located on a first offset shelf 652 and a respective second cooling unit (e.g., 312) can be located on a respective second offset shelf 654 that is offset respective to the first offset shelf 652. In this way, first cooling units and second cooling units of a plurality of cooling stages of a cryogenic system can be interleaved according to example aspects of the present disclosure.

Figure 7:
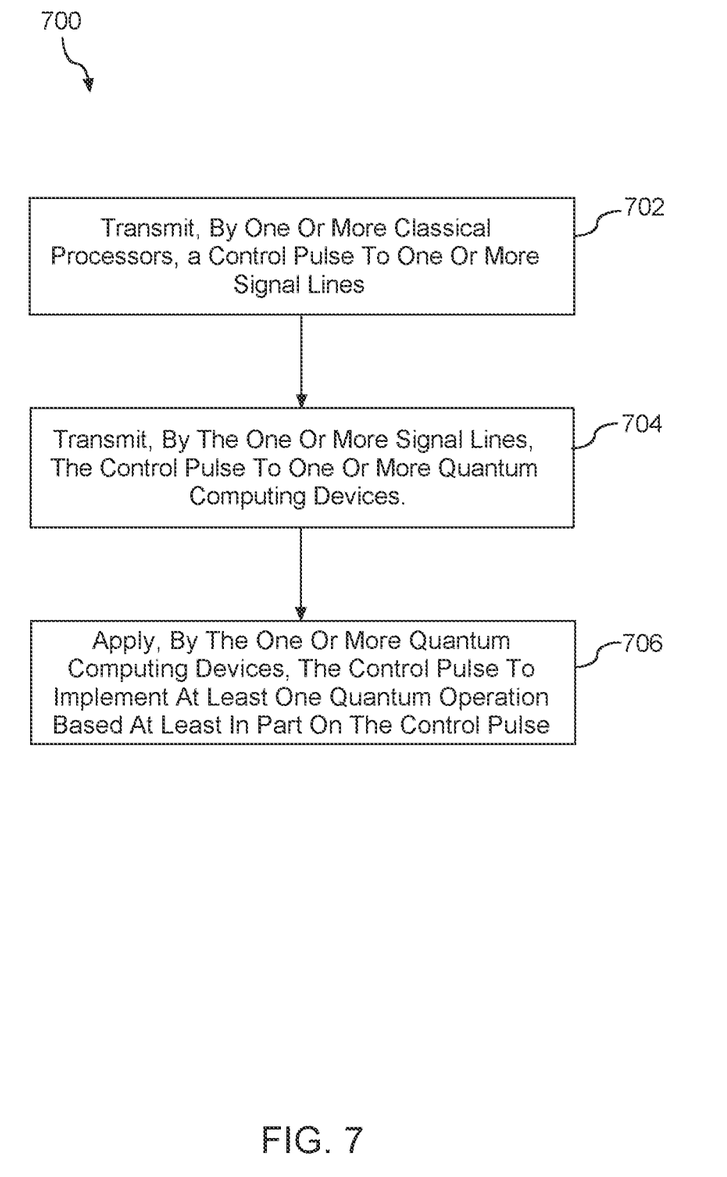
FIG. 7 depicts a flow diagram of an example method according to example embodiments of the present disclosure.

FIG. 7 depicts a flow diagram of an example method 700 according to example embodiments of the present disclosure. The method 700 can be implemented using any suitable quantum computing system, such as any of the quantum computing systems 100, 300, 400, 500 depicted in FIGS. 1-5. FIG. 7 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, include steps not illustrated, rearranged, and/or expanded in various ways without deviating from the scope of the present disclosure.

The method 700 can include, at 702, transmitting a control pulse to one or more signal lines. For example, the control pulse can be transmitted by one or more classical processors coupled to the signal line(s). The control pulse can be or can include classical (e.g., binary) computer-readable signal data, such as a voltage signal, and/or signals that are implementable by quantum computing devices.

The method 700 can include, at 704, transmitting the control pulse to one or more quantum computing devices. For example, the control pulse can be transmitted through the signal line(s) to the quantum computing device(s). The control pulse can be transmitted, by the signal line(s), through the plurality of cryogenic cooling stages. For instance, the signal line(s) carrying the control pulse can be progressively decreasing in temperature from the classical processor(s) (e.g., at room temperature and/or a temperature on the order of about 100 kelvin) to the quantum computing device(s) (e.g., at a temperature of less than about 1 kelvin, such as about 10 mK) and through the plurality of cryogenic cooling stages.

The method 700 can include, at 706, applying the control pulse to implement at least one quantum operation based at least in part on the control pulse. As one example, in some embodiments, the quantum operation(s) can be or can include obtaining state measurement(s) of the quantum computing device(s). For instance, the control pulse can instruct the quantum computing device(s) to measure the quantum state and/or resolve the quantum state to a basis state representation. Additionally, the measured quantum state can be transmitted (e.g., by the signal lines) to the classical processor(s).

As another example, in some embodiments, the quantum operation(s) can be or can include implementing at least one quantum gate operation by and/or at the quantum computing device(s). For instance, the control pulse can be descriptive of microwave pulses that are applied to the quantum computing device(s) (e.g., qubits) to perform quantum gating operations. Example quantum gating operations include, but are not limited to, Hadamard gates, controlled-NOT (CNOT) gates, controlled-phase gates, T gates, multi-qubit quantum gates, coupler quantum gates, etc.

Implementations of the digital and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A quantum computing system, comprising:
   one or more classical processors;
   one or more quantum systems comprising one or more qubits;
   one or more signal lines coupling the one or more classical processors to the one or more quantum systems; and
   a cryogenic cooling system configured to cool the one or more quantum systems to a temperature of less than about 1 kelvin, the cryogenic cooling system comprising a plurality of cryogenic cooling stages, each of the plurality of cryogenic cooling stages comprising a plurality of interleaved cooling units, the plurality of interleaved cooling units comprising a first cooling unit and a second cooling unit, and wherein the plurality of cryogenic cooling stages comprises a first coolant loop associated with the first cooling unit of each of the plurality of interleaved cooling units and a second coolant loop associated with the second cooling unit of each of the plurality of interleaved cooling units, the second coolant loop being independent from the first coolant loop;
   wherein the interleaved cooling units are arranged in an alternating stack in a vertical orientation through the cryogenic cooling system;
   wherein each of the plurality of interleaved cooling units has an associated operating temperature range;
   wherein the one or more signal lines pass through each of the plurality of interleaved cooling units for each of the plurality of cryogenic cooling stages.

2. The quantum computing system of claim 1, wherein the first cooling unit of each of the plurality of interleaved cooling units is configured to operate with a greater amount of cooling power than the second cooling unit of each of the plurality of interleaved cooling units and wherein the second cooling unit is configured to operate at a lower operating temperature than the first cooling unit.

3. The quantum computing system of claim 1, wherein the plurality of cryogenic cooling stages comprises a first stage, a second stage, a third stage, a fourth stage, a fifth stage, and a sixth stage.

4. The quantum computing system of claim 3, wherein the first stage is associated with an operating temperature range of from about 40 kelvin to about 60 kelvin, the second stage is associated with an operating temperature range of from about 10 kelvin to about 20 kelvin, the third stage is associated with an operating temperature range of from about 2.5 kelvin to about 4.2 kelvin, the fourth stage is associated with an operating temperature range of from about 600 millikelvin to about 800 millikelvin, the fifth stage is associated with an operating temperature range of from about 100 millikelvin to about 300 millikelvin, and the sixth stage is associated with an operating temperature range of from about 10 millikelvin to about 100 millikelvin.

5. The quantum computing system of claim 1, wherein the plurality of cryogenic cooling stages comprise a first pulse tube stage, an intermediate clamp stage, a second pulse tube stage, a still stage, an intermediate heat exchanger stage, and a mixing chamber stage.

6. The quantum computing system of claim 1, further comprising a Joule-Thompson cooling stage.

7. The quantum computing system of claim 1, further comprising a helium liquefier stage, the helium liquefier stage having an operating temperature of 1 kelvin.

8. The quantum computing system of claim 1, wherein the one or more qubits comprises between 10 and 100 qubits.

9. The quantum computing system of claim 1, wherein each of the plurality of cryogenic cooling stages are located in a single vacuum canister.

10. The quantum computing system of claim 1, wherein the cryogenic cooling system is configured to cool the one or more quantum systems to a temperature of about 10 millikelvin or less.

11. The quantum computing system of claim 1, wherein at least one of the first cooling unit or the second cooling unit of any of the plurality of interleaved cooling units comprises one or more dilution refrigerator stages.

12. A cryogenic cooling system, comprising:
   a plurality of cryogenic cooling stages, each of the plurality of cryogenic cooling stages comprising a plurality of interleaved cooling units, the plurality of interleaved cooling units comprising a first cooling unit and a second cooling unit, and wherein the plurality of cryogenic cooling stages comprises a first coolant loop associated with the first cooling unit of each of the plurality of interleaved cooling units and a second coolant loop associated with the second cooling unit of each of the plurality of interleaved cooling units, the second coolant loop being independent from the first coolant loop;
   wherein the interleaved cooling units are arranged in an alternating stack in a vertical orientation through the cryogenic cooling system;
   wherein each of the plurality of interleaved cooling units has an associated operating temperature range;
   wherein one or more signal lines pass through each of the plurality of interleaved cooling units for each of the plurality of cryogenic cooling stages.

13. The cryogenic cooling system of claim 12, wherein the first cooling unit of each of the plurality of interleaved cooling units is configured to operate with a greater amount of cooling power than a respective second cooling unit of each of the plurality of interleaved cooling units and wherein the respective second cooling unit is configured to operate at a lower operating temperature than the first cooling unit.

14. The cryogenic cooling system of claim 12, wherein the plurality of cryogenic cooling stages comprises:
- a first stage associated with an operating temperature range of from about 40 kelvin to about 60 kelvin;
- a second stage associated with an operating temperature range of from about 10 kelvin to about 20 kelvin;
- a third stage associated with an operating temperature range of from about 2.5 kelvin to about 4.2 kelvin;
- a fourth stage associated with an operating temperature range of from about 600 millikelvin to about 800 millikelvin;
- a fifth stage associated with an operating temperature range of from about 100 millikelvin to about 300 millikelvin; and
- a sixth stage associated with an operating temperature range of from about 10 millikelvin to about 100 millikelvin.

15. The cryogenic cooling system of claim 12, wherein the plurality of cryogenic cooling stages comprise a first pulse tube stage, an intermediate clamp stage, a second pulse tube stage, a still stage, an intermediate heat exchanger stage, and a mixing chamber stage.

16. The cryogenic cooling system of claim 12, further comprising a Joule-Thompson cooling stage, the Joule-Thompson cooling stage having an operating temperature of 2 kelvin.

17. The cryogenic cooling system of claim 12, further comprising a helium liquefier stage, the helium liquefier stage having an operating temperature of about 1 kelvin.

18. The cryogenic cooling system of claim 12, wherein each of the plurality of cryogenic cooling stages are located in a single vacuum canister.

19. The cryogenic cooling system of claim 12, further comprising a helium liquefier stage, the helium liquefier stage having an operating temperature of 1 kelvin.

20. The cryogenic cooling system of claim 12, wherein each of the plurality of cryogenic cooling stages are located in a single vacuum canister.

\* \* \* \* \*